United States Patent [19]
Del Villar

[11] Patent Number: 5,356,645
[45] Date of Patent: Oct. 18, 1994

[54] MICROWAVE PUFFABLE PORK SKIN PRODUCT AND PROCESS FOR PREPARING A MICROWAVE PUFFED PORK SKIN PRODUCT

[75] Inventor: Ramon A. Del Villar, Tulancingo Hidalgo, Mexico

[73] Assignee: Pelcer, S.A., Hidalgo, Mexico

[21] Appl. No.: 132,906

[22] Filed: Oct. 7, 1993

Related U.S. Application Data

[60] Division of Ser. No. 984,237, Dec. 1, 1992, which is a continuation of Ser. No. 590,694, Sep. 28, 1990, abandoned.

[51] Int. Cl.$^5$ ............................................. A23L 1/312
[52] U.S. Cl. .................................... 426/107; 426/129; 426/234; 426/241; 426/242; 426/332; 426/438; 426/445; 426/510
[58] Field of Search ............... 426/107, 129, 234, 242, 426/332, 438, 445, 641, 645, 417, 510, 241

[56] References Cited

U.S. PATENT DOCUMENTS

| | | | |
|---|---|---|---|
| 2,179,616 | 11/1939 | Darrow | 426/438 |
| 2,547,747 | 4/1951 | Darrow | 426/438 |
| 2,855,309 | 10/1958 | Anderson et al. | 426/641 |
| 2,907,660 | 10/1959 | O'Brian et al. | 426/438 |
| 2,947,635 | 8/1960 | Paynter et al. | 426/441 |
| 3,401,045 | 9/1968 | Halpern | 426/332 |
| 3,725,084 | 4/1973 | Rydeski et al. | 426/445 X |
| 4,525,367 | 6/1985 | Allison | 426/445 X |
| 4,786,513 | 11/1988 | Monforton et al. | 426/107 |
| 4,857,342 | 8/1989 | Kappes | 426/107 |

*Primary Examiner*—Arthur L. Corbin
*Attorney, Agent, or Firm*—Oblon, Spivak, McClelland, Maier & Neustadt

[57] ABSTRACT

Low-fat pork skin pellets can be produced by steam cooking pork skin portions and if necessary oil cooking the steam cooked portions to produce pork skin pellets. The pork skin pellets are then placed in a microwavable container. When cooked in a microwave oven, the pork skin pellets puff to produce a pleasant tasting crispy pork skin snack food.

15 Claims, 3 Drawing Sheets

MICROWAVE PUFFABLE PORK SKIN PRODUCT AND PROCESS FOR PREPARING A MICROWAVE PUFFED PORK SKIN PRODUCT

This is a division of application Ser. No. 07/984,237, filed on Dec. 1, 1992, which is an FWC of Ser. No. 07/590,694, filed on Sep. 28, 1990, now abandoned.

BACKGROUND OF THE INVENTION

1. Field of the Invention

The invention relates to a pork product pellet which can be puffed by microwave radiation. More specifically, the invention relates to a microwavable pork skin pellet which is packaged in an expandable container. The pork pellets contained in the package may then be expanded in a microwave oven to produce a puffed pork crackling which is low in fat content and ready for human consumption.

2. Discussion of the Background

Typical Mexican food is becoming popular internationally, in particular pork cracklings. Pork cracklings are generally prepared from bacon rinds or pork skins.

Bacon rinds or pork skins have a tough leathery consistency. It is well-known that these tough pork skins can be boiled and then fried in hot oil to produce puffed pork "cracklings". The cracklings are crisp and have a mild bacon flavor. The production of pork cracklings domestically entails serious drawbacks, however, primarily due to the use of oil or butter at elevated temperatures of 200° C. or higher. Fried puffed pork products are available commercially, but contain relatively high amounts of fat.

Modern consumers favor foodstuffs which have a low fat content. Low fat cooking is possible using microwave ovens which are obtaining great popularity in households all over the world. Microwave cooking is conventional and economical.

A pork rind product is described in U.S. Pat. No. 3,401,045, which is prepared by cutting pork rinds or skins into small pieces and rendering the skins at temperatures in the range from 235°–255° F. to harden the rinds or skins and reduce their size. The pork skins are rendered in hot oil or fat, cured in an aqueous curing or flavoring solution and then dried. The dried pieces of pork skin are then cooked in vegetable oil or shortening to puff the pork skin pieces at temperatures from about 400°–425° F. Such fried pork puffed products have the disadvantage that they contain large amounts of fats and oils which have been found to contribute to heart disease and atherosclerosis.

U.S. Pat. No. 2,855,309 discloses pre-treating pork rinds in an acetic acid solution to improve the puffing qualities of pork rinds. The acetic acid treated pork rinds are then fried in hot oil.

French Patent 2,501,970 teaches making a pork rind snack product by cooking pork rinds in boiling water and skimming off the resulting fats. After flavoring, the pork rinds are dried and then briefly scalded in frying oil at approximately 140° C. After frying, the fried pork products are again fried at approximately 180° C. to effect prolonged sealing or cooked in a microwave oven.

A puffable pork food pellet is disclosed in U.S. Pat. No. 3,725,084. The puffable pellet is prepared by forcing moisture into the spaces in the molecular structure of pork skins using steam under predetermined temperature and pressure conditions. Uniform distribution of moisture causes uniform puffing of the pork skins when the moisturized skins are cooked or French fried in fat at high temperatures.

Pork snack products are also known in which the pork rinds are further processed into a gel or slurry and then puffed by means of an extruder. U.S. Pat. No. 3,793,467 discloses a method of removing hair normally associated with commercially available pork rinds by comminuting pork rinds to a relatively small particle size, suspending and slurring the pork rinds in a liquid medium to dislodge associated hair and then separating the hair from the pork rinds. The pork rinds are then dried to a moisture content below 20% and extruded in a conventional food screw extruder in a gelatinized state in which a heated die cooks and puffs the gelatinized extrudate.

U.S. Pat. No. 4,119,742 discloses a reconstituted fried and puffed product prepared by moisturizing animal parts which are high in collagen and at least 50% of which are rendered parts. Gelatinized particles are extruded, cut into small pellets, dried and deep fat fried to produce a puffed pork product.

U.S. Pat. No. 4,262,028 discloses a puffable food composition prepared by extruding a mixture of ground animal parts and starch as a partially gelatinized mixture into a shapesustaining form. The gelatinized form is then puffed in the heated die of the extruder or by subsequent hot oil frying. An expanded textured protein product is disclosed by U.S. Pat. No. 3,662,673. The textured protein product contains oleaginous seed materials and an aqueous liquid which can be internally heated by an infrared, microwave or induction oven to expand the mixture forming an irreversibly cross-linked structure.

A package of sliced bacon which can be cooked in a microwave oven is disclosed by U.S. Pat. No. 4,786,513. The bacon slices are arranged in a stack separated by individual separating sheets and placed on an absorbent blotter to absorb liquids released during cooking. The package includes an overwrap means to allow venting of expanding gases during cooking.

Processes for preparing puffable foodstuffs are disclosed by U.S. Pat. Nos. 4,608,261 and 4,525,367. The former patent discloses a helical screw conveyor for processing a raw foodstuff in particulate form, preheating the particulate foodstuff in a preheating chamber and then subjecting the preheated food to heating by microwave energy. Moist, edible ingredients are disclosed in the latter patent which are contained in a confining structure which can be burst by pressure generated by food or gas expansion. A confining structure is also used to contain the expanded mixture after heating and rupture.

Fat fried pork products are well-known, but suffer from the disadvantage of containing substantial amounts of fats which have been implicated in serious health problems. There continues to be a need for a healthy relatively low-fat pork snack product which can be puffed by the consumer, preferably in a conventional microwave oven.

Expandable microwavable packages are used in the preparation of microwave popcorn as disclosed for example in U.S. Pat. No. 4,219,573. In order to obtain good results, it is advisable to attach to the container a segment of thermal material (susceptor) which limits the loss of heat from the corn to the bottom of the microwave oven.

SUMMARY OF THE INVENTION

One object of the present invention is to provide a microwave puffable pork product having a relatively low fat content yet adequate moisture content for good expansion in a microwave oven. Preferably, the pork product can be cooked and puffed in a conventional microwave oven to produce a convenient and healthy snack product.

Another object of the invention is to provide a container which is expandable by the evaporation of water during production of the pork crackling by microwave radiation, where the container is manufactured from a material suitable for cooking foodstuffs for human consumption in microwave ovens, and where the container has a high resistance to the diffusion of pork fat through the container. The container should avoid heat loss, conserve energy and be suitable for use in any conventional microwave oven.

These and other objects which will become apparent from the following specification have been achieved by the present microwave puffable pork skin product, container and the present process for preparing this pork product.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
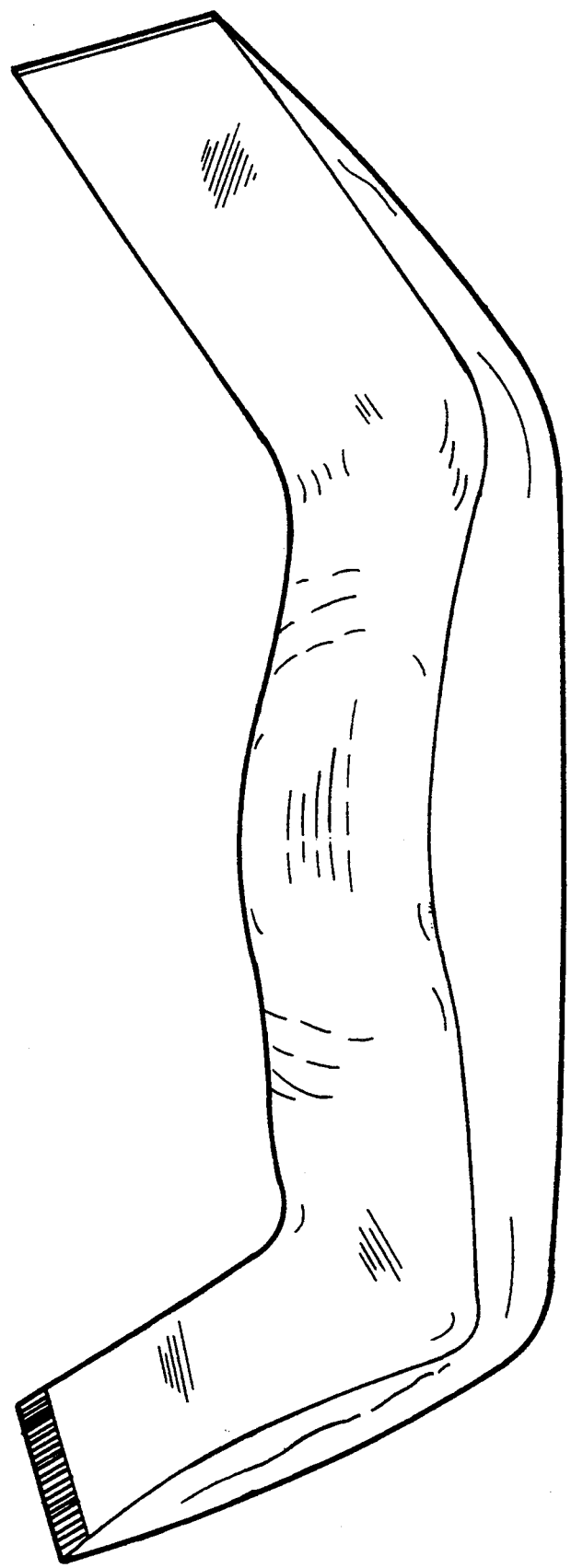
FIG. 1 is a perspective view of the microwavable package of the present invention.

It has been discovered that a healthy relatively low-fat snack product can be obtained without the need for conventional high heat frying processes. In the process of the present invention, fresh, refrigerated, frozen, natural, smoked or salted pork skins or pork skins otherwise preserved may be used. Preferably, the skins are free of hair and hair roots. The pork skin may be obtained from the back, belly, ham, shoulder etc., singly or in mixtures, and is generally cut in sizes ranging from about $\frac{1}{2}$ inch to about $1\frac{3}{4}$ inches. Curing salts, flavoring agents, etc. may be added to the pork skins before or during cooking. The raw pork skins may contain varying amounts of fat and flesh, although the preferred raw pork skins contains as little flesh and fat as possible since the additional fat requires additional cooking times.

The pork skins are first placed in a conventional steam cooking vessel. The skins are heated to a temperature between about 110° C. and 155° C. by means of steam pressure and cooked for a time ranging from about $2\frac{1}{2}$ to about 6 hours. During the steam cooking process, moisture and fat are extracted from the pork skins by a combination of fusion and compression generated by the steam cooking. The exact cooking time depends upon the percentage of fat and moisture in the pork skins to be cooked and can be readily determined by one skilled in the art. Obviously, at higher temperatures, cooking times are shorter and at lower temperatures, cooking times are longer.

Fat and moisture removed from the skins and produced by the steam cooking process may be removed from the steam cooking vessel by any conventional means, such as, for example, by gravity flow through the bottom of the cooking vessel. When the desired percentage of fat and moisture is present in the pork skins, the skins are withdrawn from the steam cooking vessel.

In some cases, the steam cooked pork skins withdrawn from the steam cooking vessel, may have excessive moisture content, typically between about 15–20 wt %. If the moisture content of the steam cooked pork skins is too high, the pork skins are passed to an oil cooking vessel to further dehydrate the pork skins. Generally, the oil cooking process is conducted at a temperature of about 100° C. to 120° C. until the desired moisture content is obtained. The correct cooking time can be determined by intermittently sampling the cooking product to determine the average moisture content.

In this embodiment of the invention, oil cooking has the added advantage of improving the texture of the final pork skin pellet product. Whether cooked by steam cooking only or by steam/oil cooking, the final pork skin pellet has a relatively low fat content, generally less than 15 wt. % and preferably as low as about 6 wt. %.

As noted above, the pork skins or defleshed pork skins are generally cut into discrete portions or squares having a size of about $\frac{1}{2}$–$1\frac{3}{4}$ inch per side and cooked as discrete portions. During the cooking process, fat and moisture are removed and, therefore, the pork skins are reduced in size during the cooking process. The cooked pork skin product will have varying sizes ranging from about $\frac{1}{8}$ inch to about $1\frac{1}{4}$ inches per side of the cooked pork pellet. The cooked pellets are dark brown in color and have characteristic flavor and smell. After cooking, the pork pellets are cooled and may be selected by size if desired.

During cooking, additives such as flavoring agents, stabilizers, pH regulators and anti-oxidants may be added to the cooking vessel to provide a snack product having the desired taste and storage stability. Typically, salt, preferably iodized salt, and sugar or dextrose are added as flavoring agents. Generally, salt is added in a greater amount than dextrose or sugar to impart the desired salty flavor to the snack product. Salt is usually added in amounts up to about 10 wt. %, preferably about 0.5–5 wt. %, more preferably about 1–3 wt. %. Dextrose or sugar is added in amounts up to about 0.3 wt. %, preferably about 0.005–0.3 wt. %, more preferably 0.01–0.1 wt. %. Obviously, amounts of salt and dextrose or sugar above or below these preferred amounts may be added to obtain a snack product having a more salty or sweeter flavor as desired.

Additionally, other conventional flavorings may be added at amounts sufficient to impart the desired taste characteristics to the snack product. For example, conventional flavorings which impart, smoke, bacon or barbecue flavors may be added during the steam cooking process to impart these particular flavors to the pork skin product. The amounts of additional flavorings can be readily determined by one skilled in the art by analyzing the final flavor obtained in the snack product.

Generally, additives are also added to improve the texture and storage stability of the microwavable product. Such additives include stabilizers, pH regulators, antioxidants and anti-microbial agents. Typical anti-oxidants such as butylated hydroxyanisole (BHA) and butylated hydroxytoluene (BHT) may be added as antioxidants in antioxidizing amounts sufficient to prevent the fat content of the final product from becoming rancid. Other anti-oxidants which may be added include ascorbic acid, estorbic acid, tocopherols such as $\alpha$-tocopherol, sodium ascorbate, calcium ascorbate, 2,6-ditert.-butyl-4-hydroxymethyl phenol, 2-(1,1-dimethyl)-1,4-benzenedione (TBHQ), sodium erythorbate, dodecyl gallate, propyl gallate, lecithin, ascorbyl palmitate, guaiac resin, dilauryl thiodipropionate and mixtures thereof. The examples given above are not limiting however and any antioxidant approved for use in food products may be used in the present invention. Typically, anti-oxidants are added in amounts of about 0.005–1.0 wt. %, preferably about 0.01–0.5 wt. %.

Lecithin serves to remove fat and is optionally added to the pork skins in amounts of about 0.05–1.0 wt. %, preferably 0.1–0.8 wt. %.

Any conventional stabilizer and/or pH regulator may be used in the present process and product. For example, sodium hexametaphosphate and sodium bicarbonate may be added during the cooking process. Other known pH regulators which may be used in the present invention include ammonium bicarbonate, sodium bicarbonate, potassium bicarbonate, ammonium carbonate, sodium carbonate, potassium carbonate, calcium carbonate, magnesium carbonate, sodium citrate, potassium citrate, ammonium phosphate, ammonium hydrogen phosphate, sodium hydrogen phosphate, tricalcium phosphate, sodium fumarate, calcium lactate, sodium lactate, magnesium oxide, sodium tartrate, potassium tartrate and mixtures thereof. The stabilizer pH regulator are not particularly limited and other stabilizers and pH regulators which have been authorized for use in food products may be used in the present invention. The stabilizer (e.g., sodium hexametaphosphate) is added in an amount of about 0.005–1.0 wt. %, preferably about 0.05–0.50 wt. %. The pH regulator (e.g., $NaHCO_3$) is generally added in quantities of about 0.001–1.0 wt. %, preferably about 0.01–0.05 wt. %. These additives may be added to the pork skins during cooking.

After cooking, the finished pork pellet is relatively low in fat, containing less than 15 wt. % fat, preferably about 5–15 wt. %. More preferably, the finished product contains about 6–10 wt. % fat. The fat content of the finished pork product can be readily varied by adjusting the cooking process, time and/or temperature as described above.

In a particularly preferred embodiment, the final pork skin pellet has the following characteristics:

| Component | % by Weight | |
|---|---|---|
| Moisture | 6–10% | |
| Fat | 7–15% | |
| Ash | 4% | |
| Salt | 3–8% | |
| AGL (Free fatty acids) | 0.2% | |
| I.P. (Peroxide value) | 0.5 | M.E.Q. |
| pH | 7 | |

The final pork product in pellet form can be cooked in a conventional microwave oven at suitable oven settings. Suitable temperature settings include high, medium, low, etc. for a time span of from about 3–5.5 minutes depending on the quality and strength of the microwave oven. Cooking in a microwave oven puffs the pork pellet to provide a pleasant tasting crispy puffed snack food.

Preferably, the pork pellets are packaged in an expandable microwavable container suitable for use in a microwave oven. The internal volume of the container should be expandable due to evaporation of water contained in the cellular and inter-cellular spaces of the pork pellet. In general, microwavable packages are well-known in the art and the present invention is not particularly limited to any specific type of microwavable package. Preferred microwave packages, however, are paper packages made using adhesives and inks acceptable for use in the food industry.

The problems of heat loss which is observed in microwave packages used with microwave popcorn does not exist in the production of pork cracklings in microwave ovens. This is due to the fact that the pork pellet has a large heat capacity and the oil is contained inside the pellet itself and not added to the package as with microwavable popcorn. Accordingly, there is little heat loss when the pellet is exposed to microwave radiation and cooking is efficient. This can be shown by producing pork cracklings starting with the pork pellets of the present invention in containers both with and without a thermal insulating susceptor portion and measuring the degree of expansion of the pellets and number of pellets not expanded. The results of this test, when subjected to statistical methods, show no significant difference in expansion of pellets or number of pellets expanded in the presence of or absence of a thermal insulating susceptor portion.

Figure 2:
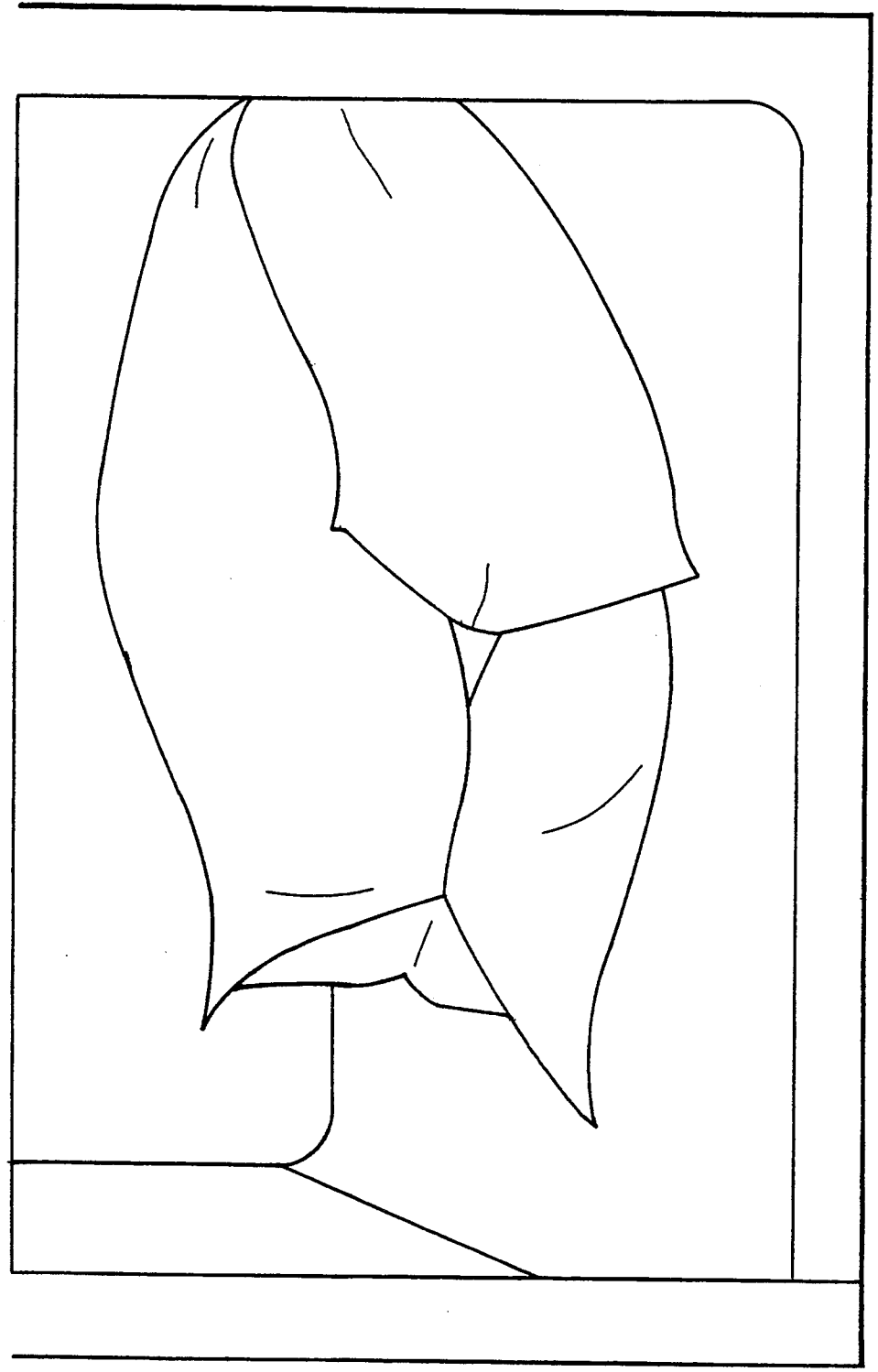
FIG. 2 illustrates the package in its expanded state in a microwave oven.

From an aesthetic prospective, the microwavable package, preferably a microwavable bag as shown in FIGS. 1 and 2, should be made of a material which is substantially resistant to the penetration of pork fat and at the same time heat insulating. The package may be constructed of any material which prevents penetration of oil and is adaptable for use in microwave ovens. Preferably, the material is both heat insulating and transparent to microwave radiation. Preferred materials include cork, corrugated paper and ceramic paper, although other equivalent materials which have similar properties of resistance to pork fat penetration and thermal insulation may be used to prepared the package of the present invention. The package may be made from one or multiple layers of such material.

The material of the microwavable package should have thermal insulating properties so that at least 12–18 calories/gram of expandable pellets are retained in the microwavable package. Preferably, the insulating material is capable of retaining at least 20 calories, more preferably at least 24 calories and even more preferably at least 27 calories per gram of pellets. The thermal conductivity of the package material should be less than 0.0005 calories/$cm^2$ and have a densisty of less than 0.2 g/$cm^3$. More preferably, the package material should have a thermal conductivity less than about 0.00025 and a density less than about 0.1 g/$cm^3$. The thickness of the package material is not particularly critical but is generally from about $\frac{1}{8}$–$\frac{1}{4}$ inch. Preferably, the insulating package material includes corrugated paper. The use of insulating portions or layers is known in the art as taught for example in U.S. Pat. No. 4,219,573

The properties of pork cracklings cooked in a microwave bag both with and without a microwave refracting insulating portion over the middle $\frac{1}{3}$ surface of the microwavable bag (the surface of the bag in contact with the microwave oven floor) were examined. Thirty bags of each type containing the pork pellets of the present invention were subjected to microwave radiation. The number of unexpanded pork pellets and the total volume of expansion of the pellets into pork cracklings was determined. No significant statistical difference was found between the pork cracklings prepared in the microwavable bag with an insulating portion and those cracklings prepared in the microwavable bag without the insulating portion.

Figure 3:
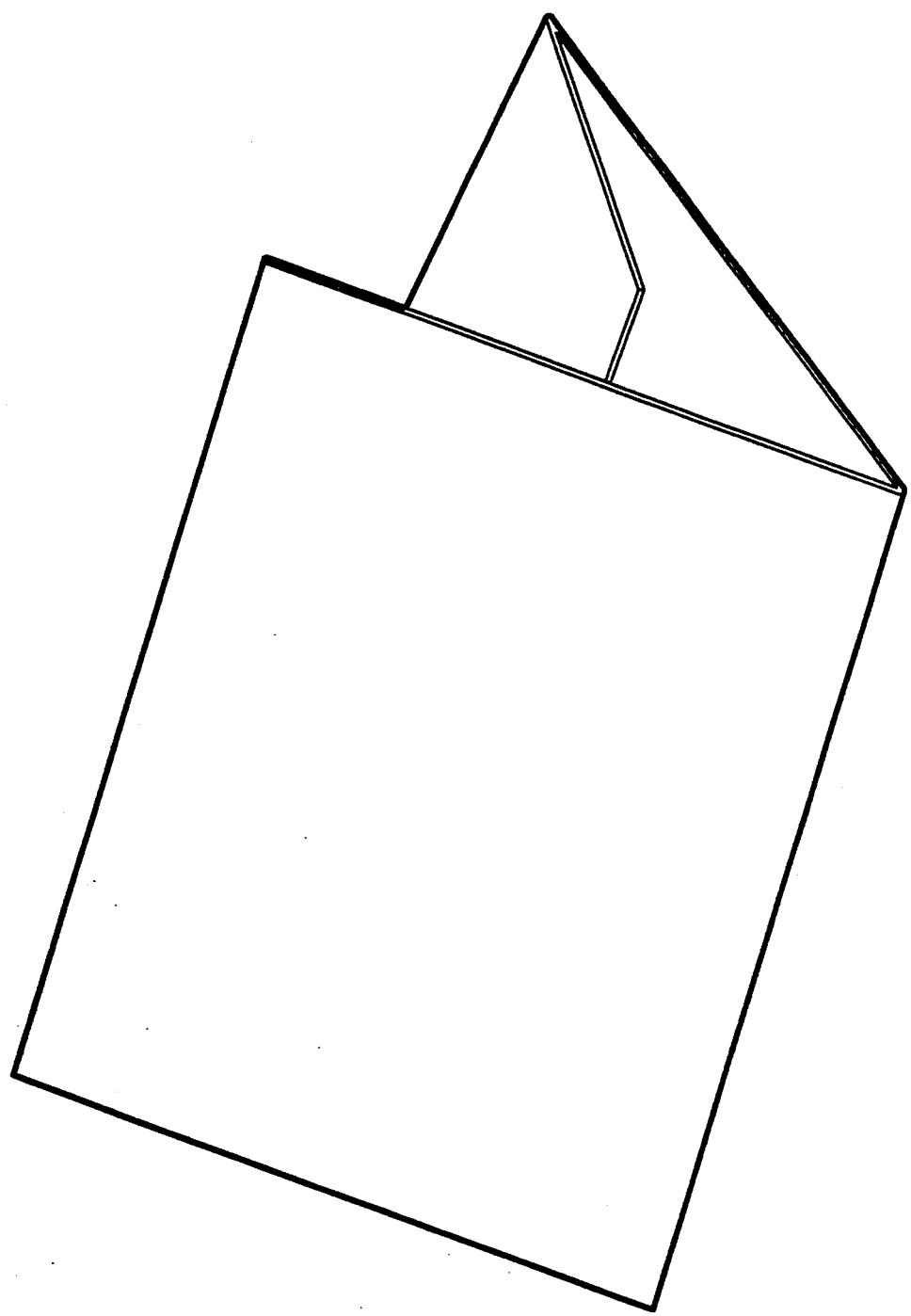
FIG. 3 illustrates the package folded into thirds.

In commercial application, the package may be folded into thirds in order to obtain the preferred packing volume and allow an advertising label to be presented to the customers view. See FIG. 3. Additionally, folding the package into thirds confines the pork pellets to exactly the middle ⅓ of the container which facilitates cooking in a microwave oven.

The package may be sealed by any known appropriate method for sealing microwavable bags to avoid contact with the atmosphere yet provide access to the cooked product. An opening means may be provided such as a string, to facilitate the opening of the container and its removal from the microwave oven after the pork crackling product has been prepared. See for example, U.S. Pat. No. 4,219,573.

The amount of pork pellets contained in a package is variable and can be selected as desired. In general, each package will contain from about 50–125 grams of pork pellets, which provides an expanded volume of pork cracklings of approximately 100–2400 cm$^2$. The amount of pork pellets contained in an individual package is dependent upon the size of the individual pellets and upon the desired dimensions of the microwavable package and can be varied as desired.

The microwavable pork product of the present invention is a healthy snack food, low in fat and easily prepared in a microwave oven. Since the product is puffed in a microwave oven and not deep fat fried, the fat content of the product is substantially lower than conventional puffed pork products. When produced in convenient unit packages, a consumer may simply place the microwavable package into a home microwave oven and obtain a warm snack in only a few moments. The present product when puffed is a healthy and tasty snack food.

Other features of the invention will become apparent in the course of the following description of an exemplary embodiment which is given for illustration of the invention and is not intended to be limiting thereof.

EXAMPLE

Pork skins (380.00 kg), salt (9.00 kg), sodium hexametaphosphate (0.59 kg), dextrose (0.20 kg), sodium bicarbonate (0.09 kg) and BHA (1.16 kg) were combined, mixed and cooked at 150° C. for 3–4 hours in a steam cooking vessel. During the cooking process, fat produced by the steam cooking was removed through the bottom of the cooking vessel.

After cooking, the product was cooled for thirty minutes and selected by size. The finished product contained about 13% fat.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for preparing a microwave puffed pork product comprising the steps of:

(a) steam-cooking pork skin portions to reduce the fat and moisture content thereof;
(b) cooking the steam cooked pork skin portions in oil at a temperature of about 100°–120° C. for a time sufficient to obtain a moisture content in the pork skin portions of about 5–15 wt. %;
(c) placing into a microwavable container a composition consisting essentially of the pork skin portions from step (b); and
(d) puffing said composition of part (c) by application of microwave energy.

2. The process of claim 1, wherein said steam cooking step is conducted at a temperature of about 110°–155° C.

3. The process of claim 1, wherein said steam cooking is conducted for about 2.5–6 hours at a temperature of about 100°–155° C.

4. The process of claim 1, wherein said steam cooked pork skin portions are about ⅛–¼ inch per side of said portion.

5. The process of claim 1, further comprising adding at least one flavoring agent, stabilizer, pH regulator or antioxidant to said pork skin portions during said steam cooking step.

6. The process of claim 5, comprising adding 0.5–5 wt. % salt, 0.005–0.5 wt. % dextrose, 0.05–2.0 wt. % antioxidant, 0.01–1.0 wt. % stabilizer and 0.001–0.1 wt. % pH regulator.

7. The process of claim 1, wherein said steam cooking step is conducted until the fat content of said pork skin portions is less than 15 wt. %.

8. The process of claim 7, wherein said steam cooking is conducted until the fat content of said pork skin portions is about 6–10 wt. %.

9. The process of claim 1, wherein step (c) further comprises folding said microwavable container into thirds and confining the pork pellets to the middle ⅓ of the container.

10. A microwave puffable pork skin product in a microwavable container prepared by a process comprising the steps of:

(a) steam-cooking pork skin portions to reduce the fat and moisture content thereof;
(b) cooking the steam cooked pork skin portions in oil at a temperature of about 100°–120° C. for a time sufficient to obtain a moisture content in the pork skin portions of about 5–15 wt. %;
(c) placing into a microwavable container a composition consisting essentially of the pork skin portions from step (b);
(d) folding said microwavable container into thirds; and
(e) confining said pork skin portions from step (b) to the middle ⅓ of said microwavable container.

11. The microwave puffable pork skin product in a microwavable container according to claim 10, wherein said steam cooking is conducted for about 2.5–6 hours at a temperature of about 100°–155° C.

12. The microwave puffable pork skin product in a microwavable container according to claim 10, wherein said steam cooked pork skin portions are about ⅛–¼ inch per side of said portion.

13. The microwave puffable pork skin product in a microwavable container according to claim 10, further comprising adding at least one flavoring agent, stabilizer, pH regulator or antioxidant to said pork skin portions during said steam cooking step.

14. The microwave puffable pork skin product in a microwavable container according to claim 13, comprising adding 0.5–5 wt. % salt, 0.005–0.5 wt. % dextrose, 0.05–2.0 wt. % antioxidant, 0.01–1.0 wt. % stabilizer and 0.001–0.1 wt. % pH regulator.

15. The microwave puffable pork skin product in a microwavable container according to claim 10, wherein said steam cooking step is conducted until the fat content of said pork skin portions is less than 15 wt. %.

* * * * *